Feb. 13, 1968 R. A. SANGER 3,369,136

SUBMERSIBLE MOTOR

Filed Aug. 6, 1965

INVENTOR
ROBERT A. SANGER
BY
Merl E. Sceales
ATTORNEY

United States Patent Office 3,369,136
Patented Feb. 13, 1968

3,369,136
SUBMERSIBLE MOTOR
Robert A. Sanger, Troy, Ohio, assignor to A. O. Smith Corporation, Milwaukee, Wis., a corporation of New York
Filed Aug. 6, 1965, Ser. No. 477,743
6 Claims. (Cl. 310—87)

This invention relates to a submersible motor and particularly to a lower thrust bearing assembly for rotatably supporting of the motor's rotor.

In submersible pump motors and the like for pumping of water and other fluids, the submersible motor with a pump secured to the upper end thereof is normally suspended within the well for various reasons. To remove the unit from the well is a time consuming and relatively expensive procedure. Further, the down time associated with a broken unit causes substantial inconveniences particularly where the submersible motor pump unit forms a part of a domestic water system. Consequently, in the design of submersible motors, the reliability and the life of the unit becomes highly important.

In the pumping operation, substantial thrust forces are generated which are transmitted through a thrust bearing unit to the motor frame and thus to the support structure for the unit. The provision of a reliable thrust bearing unit having a long life has been a continuing problem in the art of submersible motors. The present invention is particularly directed to a submersible motor thrust bearing incorporating an improved leveling means.

Generally, in accordance with the present invention, the lower end of the rotor is provided with a machined end ring to define a supporting surface at right angles to the center line of the shaft. The lower end of the motor includes a bearing housing having a needle thrust bearing mounted on a leveling mechanism with the machined surface of the rotor end ring riding on the thrust bearing. The needle thrust bearing is formed in accordance with known constructions with a plurality of rolling elements radially extended between upper hardened and ground steel thrust races. The upper thrust race has the motor end ring resting thereon and rotates with the rotor and the shaft. The lower thrust race rests on the leveling device which includes a conventional washer having a pair of locking holes. Interposed between the washer and the hub is a rocker plate having oppositely extending pivot supports circumferentially distributed about the shaft axis. The rocker plate rests on the lower bearing housing and is free to pivot on the lower pivot supports. The leveling washer rests upon the upwardly directed pivot supports and provides an enlarged flat surface upon which the lower hardened thrust race of the thrust bearing is supported. Additionally, pin and slot interengagements are provided from the rocket plate to the housing and to the washer to prevent rotation of the rocket plate and the washer while permitting the desired pivotal movement.

In operation, during the rotor shaft rotation, the upper race rotates with the rotor as a result of the frictional forces directly therebetween and the bearing needles may roll on the lower ground steel thrust race. Generally, the frictional forces between the washer and the lower race prevent relative rotation therebetween and hold the lower thrust race relatively fixed. However, the washer and rocker plate remains free to pivot on the pivot supports to maintain the surface of the lower thrust race always parallel to the surface of the upper thrust race. As a result, all of the rollers of the needle thrust bearing will be maintained in equalized contact with the thrust races at all times and substantially reduce or eliminate adverse wear.

It has been found that the level needle thrust bearing and leveling unit of this invention has an unusually long and reliable life in the presence of the substantial thrust loads generated in a submersible motor. This is particularly true in connection with oil filled submersible motors wherein the oil provides additional lubrication to the thrust bearing unit.

The drawing furnished herewith illustrates a preferred construction of the present invention disclosing the above advantages and features as well as others which will be clear from the following description of the drawing.

Figure 3:
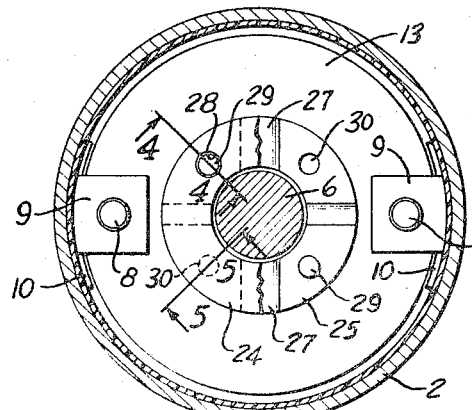
FIG. 3 is a transverse section taken on line 3—3 of FIG. 1 showing the interrelationship of the leveling assembly.
Figures 4, 5:
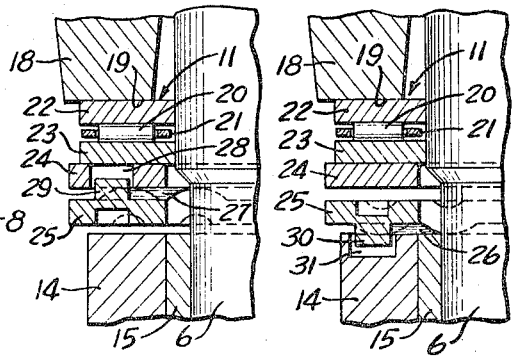
FIG. 4 is a fragmentary section taken generally on line 4—4 of FIG. 3.
FIG. 5 is a fragmentary section taken generally on line 5—5 of FIG. 3.
Figure 1:
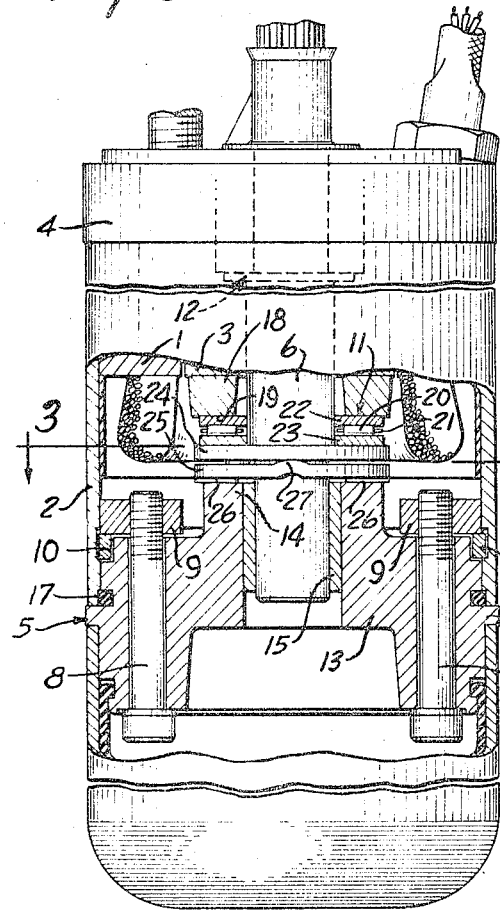
FIG. 1 is a side elevational view of a submersible motor unit with parts broken away to show details of the construction and particularly the improved thrust bearing assembly.

Referring to the drawing and particularly to FIG. 1, the illustrated submersible motor includes an annular stator member 1 centrally located within an outer tubular main shell or frame 2. An armature 3 is rotatably mounted in alignment with the annular stator 1 and rotatably supported to the opposite side of the stator within an upper end frame 4 and a lower end frame 5, respectively. The armature 3 is carried by shaft 6 which projects outwardly through and is journaled in the upper end frame 4 for connection to a pump, not shown. The lower end of shaft 6 is journaled in the lower end frame 5. The illustrated motor is of the oil filled type and includes a flexible bag unit 7 secured to the lower end of the motor beneath end frame 5 to maintain the main frame 2 filled with oil, not shown, generally in accordance with the known operation of a motor of this type. The end frames 4 and 5 are similarly interconnected to the main frame 2 by the improved means of this invention which includes a plurality of attachment bolts 8 which pass through the corresponding end frames 4 and 5 with a square nut 9 on the inner end thereof. Anchor lugs 10 are provided on the inner face of main frame 2 and project inwardly and outwardly of the nuts 1. The bolts 8 are drawn up tightly such that the nuts 9 engage the inner surface or face of the associated anchor lugs to clamp the end frames 4 and 5 to main frame 2 as more fully disclosed in applicant's copending application entitled "Motor End Frame Fastening Apparatus" filed on the same date as this application and assigned to the same assignee. The thrust forces established on the armature 3 as a result of operation are transmitted through suitable upper and lower thrust bearing units 11 and 12 to the respective end frames 4 and 5. The greatest forces are generated on the lower end frame 5 and the rotating thrust bearing unit 11 forming the subject matter of this application is more fully described hereinafter. The upwardly directed thrust forces are substantially less and a simple wear ring unit 12 is therefore all that is needed.

More particularly the main frame 2 is generally a relatively thin tubular shell with stator 1 suitably secured centrally thereof.

The lower end frame 5 is a cast member and has an annular portion 13 and a central radial bearing hub 14 projecting inwardly from the portion 13. The hub 14 includes an inner radial bearing 15 within which the corresponding end of the armature shaft 6 is rotatably disposed. The inner face of the hub 14 forms a support for the thrust bearing unit 11. The outer periphery of the end frame includes a small radial flange 16 located centrally thereof which abuts the end face or edge of the main frame with the portion 13 machined to closely slidably fit within the cylindrical end of the main frame. An O-ring seal 17 is interposed in suitable mating recesses between adjacent portions of the main frame and the annular portion of the end frame to create a fluid tight joint therebetween. The outer end of portion 13 defines a support means for the bag unit 7.

In the operation of the motor substantial thrust forces are generated by the reaction on the rotor 3 and shaft 6 which are transmitted to the thrust bearing unit 11 particularly forming the subject matter of the present invention.

Figure 2:
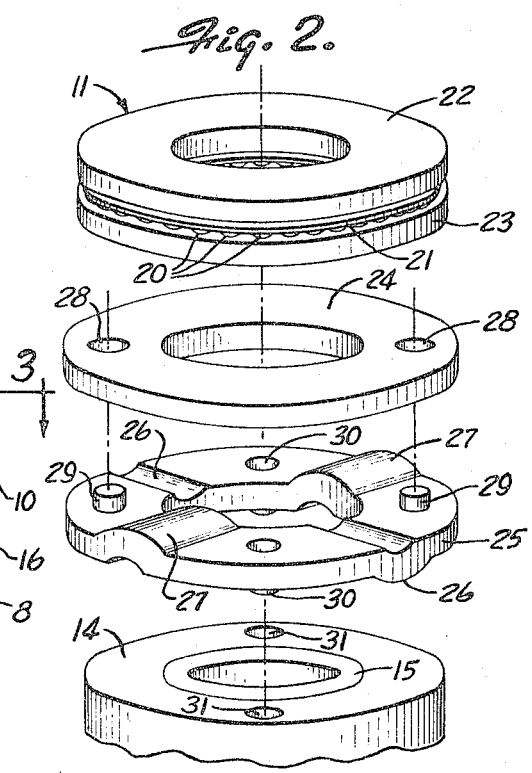
FIG. 2 is an exploded pictorial view showing the several components of the thrust bearing assembly.

Referring particularly to FIGS. 1 and 2, the rotor 3 includes an end ring 18 interconnecting the rotor bars, not shown, and having its end face ground to define a smooth bearing surface 19 perpendicular to the axis of the motor shaft 6. The end ring 18 rests on the top of a needle thrust bearing assembly which in turn rests on a leveling assembly supported on the upper end of the bearing hub.

The needle thrust bearing assembly may be of any suitable variety and as illustrated includes a plurality of bearing roller or needle elements 20 generally radially aligned with respect to the axis of rotation and suitably maintained in circumferentially spaced relation by a suitable cage 21. The needle elements 20 are rotatably mounted between a top race 22 and a bottom race 23, both races being formed of a hardened and ground steel to provide upper and lower planar bearing surfaces, respectively.

The upper race 22 has the motor end ring surface 19 resting directly thereon and rotates with the rotor 3 and shaft 6 to provide a rotating support for the rotor. The lower thrust race 23 bears on the leveling device or assembly to transmit the thrust forces to hub 14.

Generally, the leveling device includes a simple flat washer 24 interposed between the lower or bottom race 23 and a rocker plate 25 which rests directly on the upper end of the hub 14.

The rocker plate 25 is generally a ring member having four radially extended indents defining corresponding ridges spaced from each other by 90°, with a first pair of the radial ridges 26 projecting to one side of the plate and spaced from each other by 180° and thus on diametrically opposite sides thereof. The plate 25 is located with the ridges 26 resting on the end of hub 14 to pivotally support the plate for pivotal movement about the axis defined by the ridges 26. The other pair of ridges 27 similarly projects to the opposite side of the rocker plate 25 to present a pivotal supporting surface to the washer 24 along the axis of indents 27 and therefore normal to the pivotal axis of the plate 25 as defined by ridges 26. The washer 24 is a conventional steel washer having opposite planar faces. The washer 24 rests on ridges 27 and includes a pair of diametrically spaced openings 28 providing an interlock to the rocker plate 25 as follows.

The rocker plate 25 is also formed with four struck out pin members circumferentially spaced between the indents 26 and 27. Diametrically spaced struck out pins 29 project upwardly into the holes 28 of the washer 24 and the two other pins 30 project downwardly into correspondingly located holes 31 in the hub 14. The pin and hole interconnection from the plate 25 to the hub 14 and the washer 24 prevents rotation of the washer 24 and the rocker plate 25 about the axis of the shaft while permitting the free pivotal movement on the respective ridges 26 and 27.

During the rotation of the rotor 3, the thrust forces are transmitted to the needle bearing unit and particularly to the top hardened race 22 which rotates with the rotor 3 to transmit the forces to the needle elements 20. The needle elements 20 will roll on their own axes as well as about the axis of the shaft 6 to provide a rolling support for the forces which are transmitted to the lower race 23.

The planar surface engagement between the bottom race 23 and the washer 24 provides substantial frictional forces therebetween such that the lower race 23 is essentially prevented from rotating about the shaft axis by the fixed mounting of washer 24. The lower thrust bearing race 23, the interconnected washer 24 and rocker plates are however free to pivot along the normal axis of the ridges 26 and 27 such that the surface of the lower thrust race is maintained parallel to the surface of the upper thrust rate. Consequently, all of the needle elements 20 of the needle bearing are maintained in distributed contact with both thrust races 22 and 23 at all times to thereby maintain even distribution of wear and prolong the life of the thrust bearing assembly. Further, the oil in the rotor cavity continuously lubricates the needle rollers or elements 20 and increases the life of the thrust bearing unit 12.

The present invention has been found to provide a very reliable means having a long life which is therefore particularly uniquely adapted to incorporation as a part of an oil filled submersible motor which is to be disposed within a well casing for long periods of time without servicing.

Various modes of carrying out the invention are contemplated as being within the scope of the following claims particularly pointing out and distinctly claiming the subject matter which is regarded as the invention.

I claim:

1. In a submersible electric motor having a rotor rotatably mounted within a housing having a lower end frame, the improvement in a thrust bearing unit for transmitting axial thrust forces from the rotor to the end frame comprising
    a rocker plate mounted on the end frame and including upper pivotal support means and angularly displaced lower pivotal support means to permit rocking movement of the plate,
    a washer mounted on the upper pivotal support means of said rocker plate,
    means arranged to prevent rotation of the rocker plate and washer about the axis of the shaft, and
    a rolling thrust bearing unit having a lower race resting upon said washer and an upper race arranged to have the end of the rotor resting thereon to transmit axial thrust forces thereto.

2. In a submersible electric motor having a rotor rotatably mounted within a housing having a lower end frame, the improvement in a thrust bearing unit for transmitting axial thrust forces from the rotor to the end frame comprising
    a rocker plate mounted on the end frame and including upper ridge means and angularly displaced lower ridge means to permit rocking movement of the plate,
    a washer pivotally disposed on the upper ridge means of said rocker plate,
    connection means connecting the rocker plate to the end frame and to the washer to prevent rotation of the plate or washer about the axis of the shaft while permitting pivotal movement of the rocker plate and washer, and
    a needle thrust bearing having a lower race resting upon said washer and an upper race, the end of the rotor resting on the upper race to transmit axial thrust forces thereto.

3. In a submersible electric motor having a rotor with a lower end ring having a finished planar end face normal to the axis of the rotor and a housing having a lower end frame for rotatably supporting the rotor, the improvement in a thrust bearing unit for transmitting axial thrust forces from the rotor to the end frame comprising
    a ring-shaped rocker plate mounted on the end frame and including a pair of upper and lower radial ridges defined by struck out radial indents said upper ridges being on one side and on diametrically aligned portions of the plate and said lower radial ridges being located at ninety degrees to said upper radial ridges and on the opposite side of the plate, a flat washer mounted on said upper ridges on said rocker plate, pin and slot connections connecting the rocker plate to the end frame and to the washer to prevent rotation of the plate or washer about the axis of the shaft, and a rolling thrust bearing having a lower planar race resting upon said washer and an upper planar race with a plurality of rolling bearing elements interposed between said races, the planar end of the rotor end ring resting on the upper race to transmit axial thrust forces thereto.

4. In a submersible electric motor for immersion in a well and the like, a tubular motor housing adapted to be filled with oil, a lower end frame secured to the lower end of the housing and having a central radial bearing hub, a rotor disposed within the housing and having a rotor shaft with the lower end rotatably mounted in the lower end frame, said rotor having a lower end ring with a finished planar end face essentially normal to the axis of the shaft, a rocker plate encircling the shaft and having a pair of diametrically aligned radial ridges spaced 180 degrees and located on the underside of the plate and resting upon the hub and a pair of diametrically opposed similar upwardly projecting ridges displaced 90 degrees from the first pair of ridges, said plate having a pair of downwardly projecting pins spaced by 180 degrees and centrally spaced between adjacent ridges, said pins being radially located to mate with the openings in the hub, said plate having a pair of upwardly projecting pins spaced by 180 degrees from each other and 90 degrees from the downwardly projecting pins, a ring washer resting on the rocker plate about the shaft, a needle bearing unit having a lower race resting upon the washer and an upper race, said rotor being disposed with the planar end face resting upon said upper race, and means associated with the rocker plate and the washer to prevent rotation thereof about the axis of the shaft while permitting pivotal movement thereof on the ridges.

5. A submersible motor as defined in claim 4 wherein said last named means comprises cooperating axially directed pins and enlarged openings in the several members.

6. In a submersible electric motor for immersion in a well and the like, a tubular motor housing adapted to be filled with oil, a lower end frame secured to the lower end of the housing and having a central radial bearing hub having a pair of axial openings spaced 180 degrees apart, a rotor disposed within the housing and having a rotor shaft with the lower end rotatably mounted in the lower end frame, said rotor having a lower end ring with a machined planar end face essentially normal to the axis of the shaft, a rocker plate encircling the shaft and having a pair of radial ridges spaced from each other by 180 degrees and projecting from the underside and resting upon the hub to pivotally support the rocker plate, said plate having a pair of diammetrically opposed upwardly projecting radial ridges displaced 90 degrees from the first pair of ridges, said plate having a pair of downwardly projecting struck out integral pins spaced by 180 degrees and centrally spaced between adjacent ridges, said pins being radially located to mate with the openings in the hub, said plate having a pair of upwardly projecting struck out integral pins spaced by 180 degrees from each other and 90 degrees from the downwardly projecting pins, the depth of the pins being less than the depth of said ridges, a ring washer resting on the rocker plate about the shaft and having a pair of openings aligned and mating with the upwardly projecting pins, and a needle bearing unit having a lower race resting upon the washer and an upper race, said rotor being disposed with the machined end face resting upon said upper race, said races being formed of a hardened and ground steel.

References Cited

UNITED STATES PATENTS

| 2,739,252 | 3/1956 | Patterson et al. | 310—87 |
| 2,740,908 | 4/1956 | Dochterman | 310—87 |
| 2,922,055 | 1/1960 | Deters | 310—87 |

MILTON O. HIRSHFIELD, *Primary Examiner.*

L. L. SMITH, *Assistant Examiner.*